United States Patent [19]

Chevallier et al.

[11] 4,110,097

[45] Aug. 29, 1978

[54] METHOD FOR THE MANUFACTURE OF GLASS

[75] Inventors: François Edmond Chevallier, Levallois-Perret; Jean Marc Pierre Fenouillet, Paris, both of France

[73] Assignee: Saint-Gobain Industries, Neuilly-sur-Seine, France

[21] Appl. No.: 781,962

[22] Filed: Mar. 28, 1977

Related U.S. Application Data

[63] Continuation of Ser. No. 602,670, Aug. 7, 1975, abandoned.

[30] Foreign Application Priority Data

Aug. 14, 1974 [FR] France .................... 74 28188

[51] Int. Cl.² .............................................. C03B 5/02
[52] U.S. Cl. .................................... 65/136; 65/22; 65/DIG. 4; 106/52; 106/DIG. 8
[58] Field of Search ................ 65/27, 22, 134, 136, 65/347, DIG. 4; 106/52, DIG. 8

[56] References Cited

U.S. PATENT DOCUMENTS

| 1,488,914 | 4/1924 | Gelstharp | 65/134 |
| 3,511,629 | 5/1970 | Bauer et al. | 65/134 |
| 3,542,534 | 11/1970 | Yamamoto | 65/27 |
| 3,615,767 | 10/1971 | Conroy | 106/52 |

FOREIGN PATENT DOCUMENTS

1,814,624   7/1969   Fed. Rep. of Germany ............ 65/27

*Primary Examiner*—Arthur D. Kellogg
*Attorney, Agent, or Firm*—Pennie & Edmonds

[57] ABSTRACT

This invention relates to a process and an apparatus for the manufacture of fused glass, suitable for molding, wherein the total time of manufacture is reduced to about one hour. The process accelerates the homogenization and refining of glass by eliminating unfused particles and gas bubbles which are the main factors limiting the production rate of industrial glass. This is accomplished by increasing the temperature of the molten glass to produce foaming throughout its mass while maintaining its viscosity below 1,000 poises.

22 Claims, 4 Drawing Figures

METHOD FOR THE MANUFACTURE OF GLASS

This is a continuation, of application Ser. No. 602,670, filed Aug. 7, 1975 now abandoned.

SUMMARY OF THE INVENTION

The vitreous material undergoing treatment is first melted to form a molten mass having a viscosity below about 1000 poises. The molten material is then foamed throughout its mass. This foaming results in an expansion of the molten vitreous material, by volume, of at least about 1.5 and preferably between about 2 and 3. The foamed material is permitted to subside while maintaining its viscosity below 1000 poises.

DETAILED DESCRIPTION

Figures 1, 2:
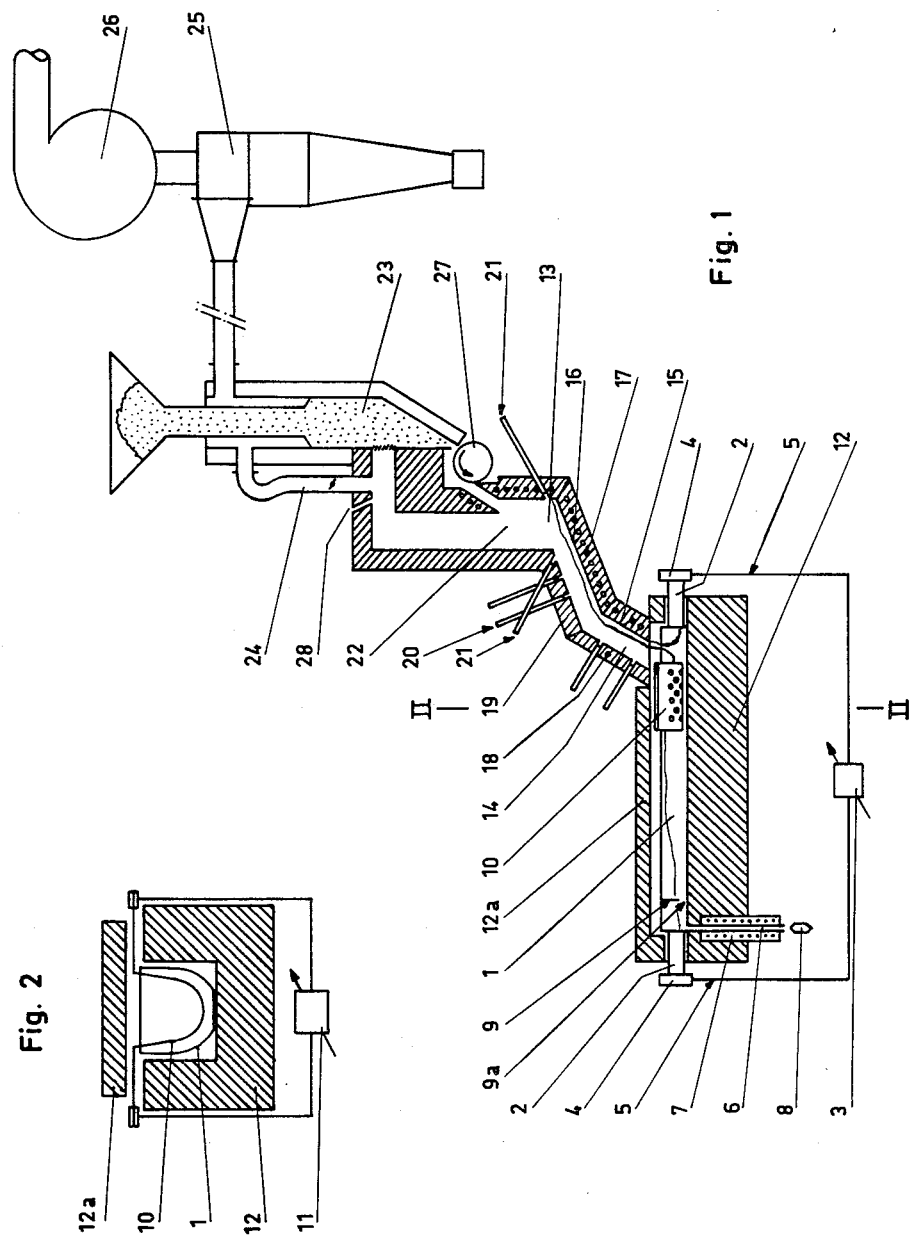
FIG. 1 is a schematic view, partially in longitudinal section, of the entire installation.
FIG. 2 is a cross section along line II—II of FIG. 1.

The vitrifiable mixtures of raw materials which can be employed in the process of the present invention are of the type commonly used in the manufacture of glass. Examples of a number of these mixtures appear in Table II.

The present invention requires that the the molten material be foamed throughout its mass. To initiate the intense and complete foaming required a number of steps may be taken. For example, foaming agents can be incoporated into the raw materials. The foaming agents give rise, in the temperature range, corresponding to the desired viscosities, to the formation of gas bubbles inside the glass.

It is also recommended that a refining agent be present, at least in the final phase, for the gases produced by these refining agents are soluble in glass, and their solubility in the molten glass increases as its temperature decreases. Thus, after the elimination of most of the gases, the refining agents aid in the readsorption of the bubbles which remain on cooling.

The foaming agents are selected such that they do not induce foaming of the vitreous material until that material has reached a desired temperature, which temperature is maintained in the refining channel. The following foaming agents are useful in the process according to the present invention: arsenic compounds, such as arsenic trioxide; antimony compounds such as antimony trioxide; sulfur compounds, such as sodium sulfate; and halogen salts such as potassium chloride. Other agents useful in the process will be apparent to those skilled in the art.

Another method of ensuring the thorough foaming of the molten mass is to subject the batch to rapid uniform heating during the foaming operation of about 20° C per minute or more. Such heating can be obtained in various ways, possibly combined, capable of acting within the batch, for example, submerged burners, submerged resistors, direct Joule effect or high-frequency induction. If desired, this foaming can be initiated or reinforced by mechanical action using an ultrasonic generator.

In a discontinuous melting installation, these heating means are employed at a time when the vitreous batch contains a large number of solid or gaseous nuclei and a sufficient amount of foaming agents to ensure an expansion of at least 1.5, and preferably above 2 times the normal volume of the mass in the unfoamed molten state.

In a continuous melting installation similar heating means can be employed. The predefined time sequence corresponds to the rate of treatment of the vitreous mass.

To aid the foaming process, it is also recommended that the vitreous mass contains a large number of nuclei, such as unmelted particles or small gas bubbles, capable of inducing the foaming. When obtaining it through direct melting of raw materials, the nuclei should be distributed throughout the molten mass at a concentration of at least 10 visible nuclei per cc. Furthermore, it is desirable that the raw materials be agglomerated or sintered. The sintering makes it possible to preheat the materials before actual melting. This melting is accomplished by a brief and intense heat transfer (less than 10 minutes) while simultaneously keeping the temperature of the materials below the foaming temperature. This permits the maintenance of a high number of nuclei consisting of unmelted particles and gas bubbles in the vitreous mass introduced into the total foaming stage. The rapid melting of the sintered raw materials can be accomplished in various ways, for example, by subjecting those materials to hot gases at a controlled temperature, which gases are driven at high speed and have a large exchange capacity. The granules can be introduced directly into the stream of the gas. The raw materials can take any number of forms, for example, granules, balls, pellets or strips. The thickness of the layer of raw materials can also vary and can be the size of smallest of the sintered materials undergoing melting.

To assure the presence of sufficient nuclei, outside nuclei, for example, cullet or colored cullet can be added to the raw materials. In relation to the usual glass refining processes, it is important to note that the present invention, requiring the presence of gas producing agents and foaming nuclei, can employ unrefined vitreous materials. It has been discovered that 1 to 2 mm grains originating from the limestone and dolomite in the material introduced in the refining tank, are totally digested at the end of the total foaming phase. The process according to the invention is therefore not dependent on the use of a vitreous batch of high quality.

In continuous manufacturing installations it is important to avoid upstream currents or currents which exist downstream of the direction of flow of the glass through the refining vessel. For example, currents of thermal origin often exist or are even deliberately created in the usual melting furnace. The currents tend, in the process according to present invention, to mix glasses in different stages of production. These undesirable currents may be eliminated by using baffles, dams, bottlenecks or cascades stationed along the course followed by the vitreous mass undergoing treatment.

It is advantageous for the width of the channel in which the molten stream flows to be narrow in relation to its length, the ratio between the two being about 1:5 or less. Another parameter that also affects the product is the thickness of the stream of flowing glass. In the example given below the height of the glass in the channel varies from 4 to 7 cm. In larger installations a height of 10 to 20 cm or more can be used provided the height of the channel walls is sufficient to ensure total expansion and damaging currents are avoided.

In order to increase the maximum velocity of the gases in relation to the materials being heated, the materials should be maintained in a slow moving thin layer. In practice, this is obtained by directing the flow of the hot gases in a direction approximately perpendicular to the inclined surface on which the granules fall. A layer of granules is easily fixed on that surface and within a few minutes become a vitreous batch ready to undergo total foaming. The surface on which the thin-layer melting is accomplished can be the inner wall of a cyclone furnace, a rotary drum combined with a scraper to remove the vitreous batch or the inclined surface on which the vitreous batch flows while being formed. The rate of flow can be regulated by the surface's slope, by the temperature which affects the viscosity of the batch and, consequently, the adhesion of the granules to that surface or by the direction and/or concentration of the gas jets. The example below describes both the process and the device of the present invention.

The installation represented in FIG. 1 comprises a channel 1 in which the molten vitreous material circulates from right to left while undergoing foaming. The refining channel is also shown in FIG. 2. Channel 1 is formed from a 0.7 mm thick sheet of 10% rhodium-alloyed platinum. Its length is 1.5 m. Both the width and the depth are 15 cm. At both ends, the channel contains connections 2 supplying it with electric current delivered by alternating current generator 3, the voltage of which is adjustable from 0 to 10 V for a power of up to 25 kVA (2500 A maximum). Connections 2 are rhodium-alloyed platinum plates 10 mm thick, 20 cm long and 10 cm high. They are held between two copper jaws 4, cooled by water circulation (not shown) and to which are attached current lead-ins 5. At its lower end, the channel contains a draw pipe 6. The draw pipe is welded to the bottom of the channel and heated by a rhodium-alloyed platinum resistor 7 wound on an insulating tube surrounding pipe 6. A cock 8 containing a rhodium-alloyed platinum needle valve allows for the gradual closing of pipe 6. Above the drawing hole, the channel is provided with a rhodium-plated platinum dam 9 which is welded to the walls of the channel and leaves a free passage 9a only 20 mm high at the bottom of the channel. The molten material flows under dam 9 before exiting through draw pipe 6. At the opposite end of the channel plunging resistor 10 is provided. The resistor consists of a U-shaped rhodium-alloyed platinum plate 0.7 mm thick and 20 cm long. Resistor 10 corresponds to the shape of the interior section of channel 1. The lower part of plunging resistor 10 is drilled with evenly distributed holes, the dimensions of which are designed to reduce by approximately 25% the area available for passage of electric current. The purpose of this is to localize the dissipation of electric power and to improve the stirring of the vitreous mass in the course of foaming. Plunging resistor 10 is supplied with electric current by alternating current generator 11 (FIG. 2) with adjustable voltage from 2 to 3 V and a power of 5 kVA. Refining channel 1 is completely surrounded by heat insulation cover 12-12a consisting of alumina bricks lined with unsealed insulating bricks. By the controlled removal of insulation, one is able to determine the temperature curve of the material along the channel.

The refining channel is fed at its upper end with a vitreous batch formed in melting furnace 13 by means of junction 14 containing inclined hearth 15. Hearth 16 of melting furnace 13 is also inclined. Steel pipes 17 cross hearths 15 and 16 perpendicular to the plane of symmetry of the system. In order to regulate the temperature of the hearths cooling fluids are passed through these pipes. Arches 18 and 19 of junction 14 and furnace 13 respectively are also covered with insulating bricks. Furnace 13 and junction 14 are heated, on one side, by burners 20 which cross the arch and are directed perpendicular to the hearths to which they correspond. On the other side, they are heated by burners 21 crossing the base of stack 22 of the furnace and stationed so that their flames converge in the area of hearth 16 where the granular material is introduced. These burners are of the type commonly called "intensive," i.e., the rate of ejection of the gases is greater than the rate of fuel combustion. The flame is caught in the combustion chamber created in the arch. These burners can be fed with a mixture of propane, air and/or oxygen from a mixer (not shown) with a capacity of 600,000 calories per hour. The flames escape through stack 22 crossing heat exchanger 23 in which gravity causes the pre-sintered vitrifiable mixture to flow backward. The gases exhausted in heat exchanger 23 as well as those coming directly from stack 22 (through bypass 24) enter dust-separating cyclone 25. The circulation and discharge of the gases are assured by fan 26. Heat exchanger 23 is made of refractory steel and contains a double wall in which is placed a powdery heat-insulating material such as kieselguhr. The introduction into the furnace of vitrifiable raw materials, sintered and preheated in exchanger 23, is assured by distributing drum 27. The rate of rotation of drum 27 regulates the feed to the furnace.

In the melting operation the vitrifiable raw material used is a material sintered in an extrusion press which supplies compacted bars 7 mm in diameter. A suitable composition of the vitrifiable materials for producing 90 kg of glass is:

| Sand (250 μm) | 60 | kg |
|---|---|---|
| Limestone (100 μm) | 8.5 | kg |
| Dolomite <1 mm | 14.5 | kg |
| Feldspar (500 μm) | 5.5 | kg |
| Dense sodium carbonate | 6.8 | kg |
| Caustic soda with 50% NaOH | 20.2 | kg |
| Fine sodium sulfate | 0.9 | kg |

The granules can be dried in a ventilated electric oven at 250° C, and stored away from moisture without other precautions.

Exchanger 23 is fed at the top with cold granules which are progressively heated to a temperature ranging between 500 and 600° C at distributing drum 27. Simultaneously, the gases entering the exchanger at 750° C are mixed with cold air admitted through hole 28 and are sucked toward cyclone 25 at a temperature of about 200° C. The granules delivered by distributor 27 fall directly on hearth 16 in the zone of convergence of burners 21. They are rapidly converted into a vitreous mass which flows over hearth 16 at an average rate of 10 cm per minute. Upon arrival at hearth 15, the temperature of the batch is 1300° C. Hearth 15 transfers the material very rapidly, due to its steeper slope and without notable heating, to the inlet of refining channel 1. Corrosion of hearths 15 and 16 is rendered negligible by limiting the temperature of their surface to approximately 800° C. This is accomplished by the cooling fluid in pipes 17. The temperature in the arches of these regions, however, is about 1450° C.

On falling into refining channel 1, the material is subjected to rapid heating by contact with the bottom and side walls of the channel and with submerged resistor 10, the temperature of which is maintained at about 1530° C. For a flow of 52 kg of glass per hour, the electric power dissipated is 28 kVA in the channel proper and 4 kVA in the submerged resistor. Due to the intense heating of the glass, upon crossing the submerged resistor 10, a swelling of the mass occurs so that the thickness of the batch about 4 cm above the submerged resistor is 13 to 14 cm.

A probe inserted at the bottom of the channel, immediately below submerged resistor 10, shows that the vitreous mass has passed totally to the foam state. At a temperature of about 1520° C downstream of resistor 10, a constant rate of swelling by foaming is obtained over approximately a 1 m length. This corresponds to a sojourn of about 15 minutes. Over the next 10 to 15 cm, the foam subsides very rapidly and the vitreous mass becomes perfectly refined glass at dam 9, where the temperature is no more than about 1450° C. The refined glass which has passed under dam 9 is drawn off through pipe 6. The level of the material in the channel is kept constant by regulating its delivery through pipe 6 using cock 8.

In the example just described, from the time a preheated granule falls on hearth 16 of the melting furnace and the time when the refined glass coresponding to that granule is drawn off through pipe 6 only 30 minutes elapses. The device is capable, without changing its dimensions, of supplying greater flows of refined glass, for example, 100 kg per hour, provided the rate of foaming is reduced. For an identical vitrifiable composition, the quantity of fine sodium sulfate introduced in the vitrifiable mixture is reduced to 0.7 kg per 100 kg of glass produced. Under those conditions, the initial height of the batch above register 10 is 7 cm, and expands to about 14 cm for an expansion of 2. Regardless the method employed (discontinuous or continuous), for a given increase in temperature and a given vitrifiable mixture, having an identical sodium sulfate content, the refining time remains constant.

Foaming of the vitreous batch throughout its mass, which constitutes the essential characteristic of this invention, has never been heretofore proposed as making it possible to accelerate the process of melting, refining and homogenization of fused glass.

The following tables give examples of the manufacture of five glasses of common type by the process according to the invention. Parts are by weight unless otherwise indicated.

Table I furnished an analysis of those glasses expressed in percentages by weight of oxides. The fusion described in the foregoing example was glass No. 1.

Table II furnishes the composition by weight of five vitrifiable mixtures suitable for manufacture of the glass in question.

Table II indicates the characteristics of the process as applied to the five glasses.

TABLE 1

| COMPOSITION OF THE GLASSES | | | | | |
| --- | --- | --- | --- | --- | --- |
| No. of Glasses Oxides | 1 | 2 | 3 | 4 | 5 |
| $SiO_2$ | 70.7 | 73.7 | 29.5 | 56.0 | 63.0 |
| $Al_2O_3$ | 1.3 | 1.2 | 2.4 | 0.05 | 2.95 |
| $Fe_2O_3$ | | | | | 0.25 |
| CaO | 10.3 | 0.5 | 0.17 | 0.05 | 7.35 |
| MgO | 3.3 | 0.25 | | | 3.1 |
| BaO | | | | 0.15 | 2.5 |

TABLE 1-continued

| COMPOSITION OF THE GLASSES | | | | | |
| --- | --- | --- | --- | --- | --- |
| No. of Glasses Oxides | 1 | 2 | 3 | 4 | 5 |
| $Na_2O$ | 14.0 | 4.8 | 1.45 | 4.2 | 14.1 |
| $K_2O$ | 0.3 | 2.55 | | 11.0 | 0.8 |
| PbO | | | 48.9 | 27.4 | |
| $B_2O_3$ | | 17.3 | 16.55 | | 5.9 |
| $Sb_2O_3$ | | | 0.7 | | |
| $As_2O_3$ | | | | 0.7 | |

TABLE II

| VITRIFIABLE MIXTURES | | | | | |
| --- | --- | --- | --- | --- | --- |
| No. of Glasses components | 1 | 2 | 3 | 4 | 5 |
| Sand | 67.0 | 72.2 | 26.65 | 56.3 | 56.1 |
| Limestone | 9.47 | | | | |
| Dolomite | 16.2 | 1.45 | | | 13.6 |
| Feldspar | 6.13 | | | | |
| Phonolite | | | | | 12.4 |
| Kaolin | | 3.2 | 6.35 | | |
| Sodium carbonate | 7.58 | | 1.5 | 6.65 | 19.65 |
| Potassium carbonate | | 2.35 | | 16.15 | |
| Barium carbonate | | | | 0.2 | 3.25 |
| Lead oxide (PbO) | | | 49.0 | 28.0 | |
| Boric acid | | 12.7 | 30.0 | | |
| Borax | | 15.65 | | | |
| Rasorite | | | | | 5.6 |
| Calcined colemanite | | | | | 8.55 |
| 50% Caustic soda | 22.5 | | | | |
| Sodium sulfate | 1.0 | | | | 1.3 |
| Sodium nitrate | | 0.5 | 1.5 | 1.0 | |
| Potassium chloride | | 1.5 | | | |
| Antimony trioxide | | | 1.0 | | |
| Arsenic trioxide | | | | 2.0 | |

TABLE III

| CHARACTERISTICS OF TREATMENT | | | | | |
| --- | --- | --- | --- | --- | --- |
| No. of Glasses | 1 | 2 | 3 | 4 | 5 |
| Preliminary melting temperature (° C) | 1350 | 1400 | 1050 | 1250 | 1300 |
| Rate of expansion heating (° C/min) | 25 | 25 | 30 | 35 | 25 |
| Expansion starting temperature (° C) | 1400 | 1450 | 1100 | 1300 | 1430 |
| Expansion | 3 | 2–3 | 2–3 | 2–3 | 2–3 |
| Time of expansion until clarification (in minutes) | 10 | 15 | 8 | 5 | 4 |
| Clarification temperature (° C) | 1520 | 1550 | 1260 | 1480 | 1480 |

Figure 3:
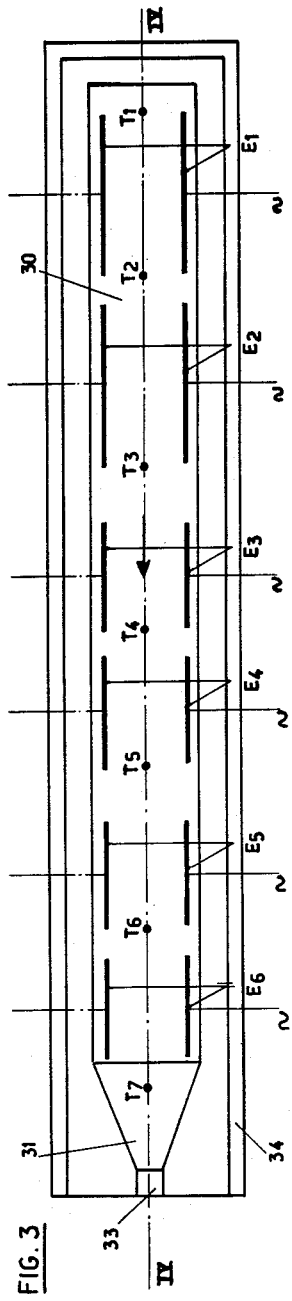
FIG. 3 is a top view of a variation of the refining channel.
Figure 4:
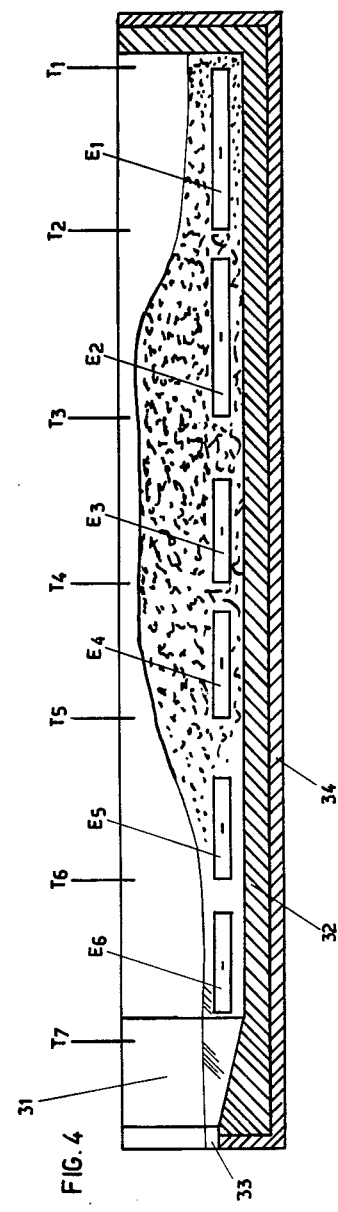
FIG. 4 is a longitudinal section along line IV—IV of FIG. 3.

FIGS. 3 and 4 describe an alternate device having a refining crucible in which the glass is heated by direct Joule effect. This device is not useful in the manufacture of the lead glasses of Examples 3 and 4, but is more economical than the previous method, because it uses molybdenum electrodes.

The crucible consists of a channel of refractory material 30, the interior rectangular cross section of which is about 25 centimeters. Its length is about 2 meters. The lower part contains a narrow funnel-type portion 31 about 5 centimeters above hearth 32 and reducing the width to a few centimeters in order to conduct the glass to outlet 33 while avoiding any blind angles likely to create stagnation.

The hearth and wall of channel 31 as well as its arch (not shown) are of a material commonly employed in conventional glass melting furnaces, an alumina and zircon-base electrofused material. Cover 34 consisting of bricks of a light refractory material provides heat insulation. The heating of the glass passing through the channel and the regulation of its temperature are assured by six pairs of electrodes $E_1$ to $E_6$. These electrodes, distributed along the edges of the channel, are made of 3-centimeter plates and are arranged symmetrically in relation to the axis of the channel. They are distributed along the edges of this channel. Each pair of electrodes is connected to an independent adjustable electric power source. The current lead-ins of the electrodes horizontally cross the walls of the channel and make possible crosswise placement of the electrodes. The lead-ins are made of molybdenum.

The glass thickness above outlet 33 is sufficient to entirely submerge the electrodes and protect them from oxidation. The current lead-ins are protected by bathing their hot parts in a reducing atmosphere consisting, for example, town gas.

The glass has free passage around the electrodes along the hearth side walls. Passage of the current from one electrode to the other produces active thermal convection which favors the crosswise homogenization of the molten mass and eliminates parasitic longitudinal currents. The result approaches a uniform flow of glass called "piston" flow. Different temperature readings are taken at the points $T_1$ to $T_7$.

Table IV shows the characteristics of the electric power supply used in a refining operation similar to that of the foregoing example, i.e., in which the batch of glass, resulting from preliminary melting of composition No. 1, is introduced into the tank at point $T_1$ at a temperature of about 1250 to 1300° C and at a flow of approximately 50 kg/h.

TABLE IV

| Supply devices | $E_1$ | $E_2$ | $E_3$ | $E_4$ | $E_5$ | $E_6$ |
|---|---|---|---|---|---|---|
| Rated characteristics: | | | | | | |
| Power (kVA) | 20 | 20 | 6 | 6 | 6 | 6 |
| Voltage (V) | 80 | 80 | 60 | 60 | 60 | 60 |
| Intensity (A) | 250 | 250 | 100 | 100 | 100 | 100 |
| Conditions for a delivery of 50 kg/h (glass No. 1): | | | | | | |
| Power supplied (kVA) | 10 | 10 | 3 | 3 | 1 | 0 |
| Temperature: | | | | | | |
| Measuring points | $T_1$ | $T_2$ | $T_3$ | $T_4$ | $T_5$ | $T_6$ | $T_7$ |
| Values (° C) | 1250 1300 | 1400 | 1550 | 1550 | 1520 | 1380 | 1250 |

We claim:

1. A process for the manufacture of glass from a foamable vitrifiable material which comprises:
   (a) melting the vitrifiable material to form a molten mass having a viscosity below about 1000 poises;
   (b) heating at an increased rate to rapidly foam the molten mass throughout its volume to at least 1.5 times its initial molten volume while maintaining its viscosity below about 1000 poises;
   (c) controlling the heating until the foamed mass subsides to dissipate the foam while maintaining it at a viscosity below about 1000 poises; and
   (d) recovering the fused liquid glass.

2. The process of claim 1 wherein:
   (a) the expansion of the molten mass is between about 2 and 3 times its normal volume in the unfoamed molten state.

3. The process of claim 1 wherein:
   (a) the progress of the molten mass occurs without return flow.

4. The process of claim 1 wherein:
   (a) the vitrifiable material is sintered.

5. The process of claim 4 wherein:
   (a) the vitrifiable material is prepared by subjecting it to rapid melting.

6. The process of claim 5 wherein:
   (a) the melting takes less than 10 minutes.

7. The process of claim 6 wherein:
   (a) the vitrifiable mixture is in the form of granules, balls, pellets or strips.

8. The process of claim 7 wherein:
   (a) the thickness of the layer of vitrifiable material during melting is the size of the smallest of the sintered elements undergoing melting.

9. A process for the manufacture of glass from a vitrifiable material containing a foaming and refining agent which comprises:
   (a) melting the vitrifiable material to form a molten mass having a viscosity below about 1000 poises;
   (b) foaming the molten mass throughout its volume while maintaining its viscosity below about 1000 poises by heating the molten mass to increase its temperature at the rate of at least about 20° C per minute from a temperature just below the foaming temperature;
   (c) continuing the foaming until the material has been expanded to at least 1.5 times its initial molten volume;
   (d) controlling the heating until the foamed mass subsides to dissipate the foam while maintaining it at a viscosity below about 1000 poises; and
   (e) recovering the fused liquid glass.

10. The process of claim 9 wherein:
    (a) the solubility of the gas forming the foam in the molten glass increases as the temperature decreases.

11. The process of claim 10 wherein:
    (a) at least one of the foaming agents is a refining compound soluble in glass.

12. The process of claim 1 wherein:
    (a) the foaming agent is selected from the group consisting of sodium sulfate, potassium chloride, antimony trioxide and arsenic trioxide.

13. A process for the manufacture of glass from a foamable vitrifiable material which comprises:
    (a) melting the vitrifiable material to form a molten mass having a viscosity below about 1000 poises and wherein said molten mass contains a number of solid or gaseous nuclei favoring foaming;
    (b) heating at an increased rate to rapidly foam the molten mass throughout its volume to at least 1.5 times its initial molten volume while maintaining its viscosity below about 1000 poises;
    (c) controlling the heating until the foamed mass subsides to dissipate the foam while maintaining it at at viscosity below about 1000 poises; and
    (d) recovering the fused liquid glass.

14. The process of claim 13 wherein:
    (a) the nuclei are distributed throughout the vitreous mass at a concentration of at least about 10 visible nuclei per cc.

15. The process of claim 14 wherein:
    (a) cullet or colored cullet is added to the vitrifiable material.

16. A process for the manufacture of glass from a vitrifiable material containing a foaming and refining agent which comprises:
    (a) melting the vitrifiable material in less than 10 minutes at a temperature below the foaming temperature to form a molten mass having a viscosity below about 1000 poises;
    (b) foaming the molten mass throughout its volume by rapidly heating the molten mass to increase its temperature at a rate of at least about 20° C per minute while maintaining its viscosity below about 1000 poises and until the material has been expanded to at least 1.5 times its initial molten volume;
(c) controlling the heating until the foamed mass subsides to dissipate the foam while maintaining it at a viscosity below about 1000 poises; and
(d) recovering the fused liquid glass.

17. The process of claim 16 wherein:
(a) the mixture is heated to 1300° C in about 6 minutes and then from 1300 to 1500° C at the rate of 30° C per minutes, the temperature being kept at 1500° C for 10 minutes before separation of the fused liqud glass.

18. A process for the manufacture of glass from a vitrifiable foamable material which comprises:
(a) melting the vitrifiable material to form a molten mass at a temperature just below the foaming temperature;
(b) heating at an increased rate to rapidly foam the molten mass throughout its volume to at least 1.5 times its initial molten volume;
(c) controlling the heating until the foamed mass subsides to dissipate the foam; and
(d) recovering the fused liquid glass.

19. A process for the manufacture of glass comprising:
(a) forming a vitrifiable mixture of materials having distributed therethrough a foaming and refining agent;
(b) rapidly melting the vitrifiable material at a temperature below the foaming temperature thereof to form a molten vitreous mass having visible nuclei distributed therethrough and a viscosity below about 1000 poises;
(c) foaming the molten mass throughout its volume by rapidly heating the molten mass to increase the temperature above the foaming temperature at a rate sufficient to produce rapid thermal convection and expansion throughout the molten mass to at least 1.5 times its initial molten volume;
(d) controlling the heating until the foamed glass subsides to dissipate the foam while maintaining it at a viscosity below about 1000 poises; and
(e) recovering the fused liquid glass.

20. A process for the manufacture of glass from vitrifiable material which comprises:
(a) melting the vitrifiable material to form a molten mass having a temperature just below the foaming temperature;
(b) continuously flowing the molten mass along a predetermined path;
(c) heating at an increased rate to rapidly foam the flowing molten mass throughout its volume until the material has been expanded to at least about 1.5 times its initial molten volume;
(d) controlling the heating until the foamed mass subsides to dissipate the foam; and
(e) recovering the fused liquid glass.

21. A continuous process for the manufacture of glass from a granular vitrifiable material having distributed therethrough a foaming and refining agent which comprises:
(a) rapidly melting the vitrifiable material to form a flowing molten mass having foam producing nuclei distributed therethrough;
(b) foaming the flowing molten mass throughout its volume by rapidly heating it to about 1500° C and above to produce rapid thermal convection and expansion throughout the flowing molten mass to at least 1.5 times its initial molten volume;
(c) controlling the heating until the foamed mass subsides to dissipate the foam while maintaining it at a viscosity below about 1000 poises; and
(d) recovering the fused liquid glass.

22. The process of claim 21 wherein:
(a) the molten mass is heated at a rate of at least 20° C per minute to produce said foaming and thermal convection.

* * * * *

UNITED STATES PATENT AND TRADEMARK OFFICE
CERTIFICATE OF CORRECTION

PATENT NO. : 4,110,097
DATED : August 29, 1978
INVENTOR(S) : Francois Edmond Chevallier et al.

It is certified that error appears in the above-identified patent and that said Letters Patent are hereby corrected as shown below:

Column 5, line 52, "furnished" should read --furnishes--;
          line 59, "Table II" should read --Table III--.
Column 8, line 33, "claim 1" should read --claim 11--.
Column 9, line 13, "fused liqud glass" should read --fused liquid glass --.
Column 10, line 3, "foamed glass" should read --foamed mass--.

Signed and Sealed this

First Day of May 1979

[SEAL]

Attest:

RUTH C. MASON
Attesting Officer

DONALD W. BANNER
Commissioner of Patents and Trademarks